C. A. ARNOLD.
TIRE BUILDER'S TOOL.
APPLICATION FILED AUG. 25, 1916.
1,209,536.
Patented Dec. 19, 1916.
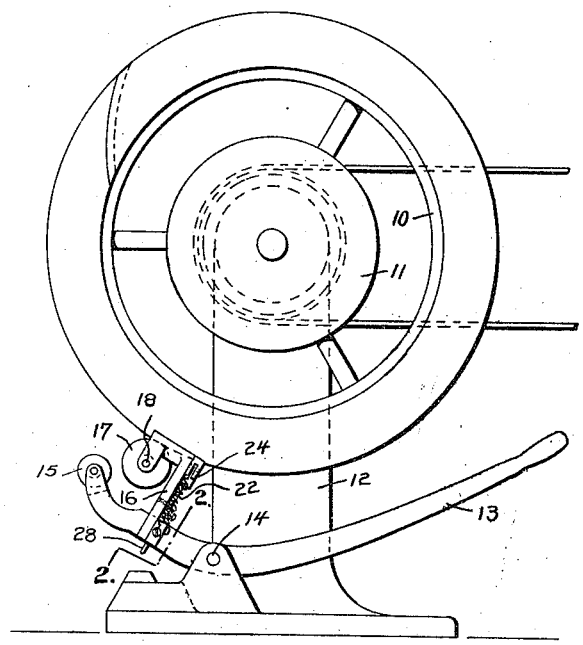
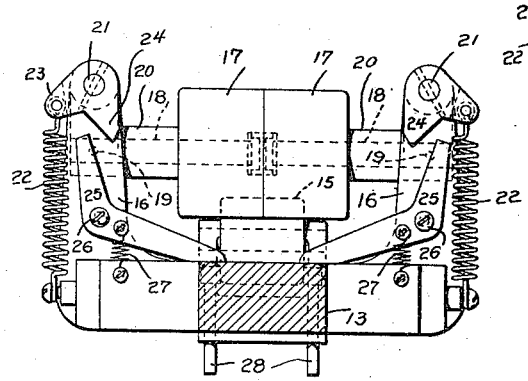
WITNESS:
S. G. Taylor
INVENTOR
Clarence A. Arnold,
BY
Ernest Hopkinson
HIS ATTORNEY

UNITED STATES PATENT OFFICE.

CLARENCE A. ARNOLD, OF HARTFORD, CONNECTICUT, ASSIGNOR TO THE HARTFORD RUBBER WORKS COMPANY, A CORPORATION OF CONNECTICUT.

TIRE-BUILDER'S TOOL.

1,209,536.

Specification of Letters Patent.

Patented Dec. 19, 1916.

Application filed August 25, 1916. Serial No. 116,794.

*To all whom it may concern:*

Be it known that I, CLARENCE A. ARNOLD, a citizen of the United States, residing at Hartford, in the county of Hartford and State of Connecticut, have invented certain new and useful Improvements in Tire-Builders' Tools, of which the following is a full, clear, and exact description.

This invention relates to the manufacture of tires and has for an object to provide a tool for compacting the treads of tire carcasses.

In the manufacture of tires it is customary to form the carcass of layers of fabric laid successively on a ring core, each layer as it is applied being centrally laid under tension against the medial portion of the core and being then pressed at the sides against the sides of the core by radially moving stitchers.

The present invention provides a device for rolling down the fabric layers forcibly into intimate contact with each other throughout a zone from the center of the carcass to points on the sides where the stitchers begin to operate.

The invention can be readily understood by reference to the accompanying drawing, in which—

Figure 1 is a side elevation of the tool in operative position. Fig. 2 is an enlarged cross-sectional view on the line 2—2, Fig. 1. Fig. 3 is a plan view of the tool.

Referring now to the drawing in which like characters of reference designate similar parts, 10 designates a ring core of the usual and well-known type, the same being carried on a chuck 11 which is mounted for rotation on a support 12.

In carrying out the invention, I provide a lever 13 which is pivoted as shown at 14 upon the support 12 and is terminally equipped with a roller 15. A U-shaped bracket 16 is formed integrally with the lever in rear of the roller 15, the arms of the bracket being spaced sufficiently apart to embrace the ring core. A pair of rollers 17 are mounted to idle on shafts 18 which are fixed by pins 19 in arms 20 of the general irregular shape shown in Figs. 1 and 2, these arms having secured thereto respective pivots 21 which are journaled in the ends of the arms of the bracket 16. The rollers 17 are normally held pressed against each other between the bracket arms by means of helical springs 22 which are connected to projections 23 that are fixed to the pivots 21.

The rollers 17 are adapted to first bear against the central or medial portion of each fabric layer as it is laid on the core to form the tire carcass, and as the lever 13 is depressed the rollers rock on their pivots 21 and move outwardly away from each other in curved paths to conform to the transverse curvature of the core. During this movement the rollers gradually press the fabric layers into intimate contact with each other from the center line of the layers outwardly to points on the sides of the layers where the stitchers will substantially begin to operate. Eventually the roller 15 will come into contact with the carcass and thoroughly roll down the central portion of the tread thereof. When the roller 15 contacts with the carcass, the rollers 17 will have reached their outer limit of movement and will have become locked in this position by dogs 24 that are formed integrally with the projections 23 and are rocked outwardly and lodge on top of angular levers 25 which are pivoted at their elbows as shown at 26 on the arms of the brackets 16 and are yieldingly held at the inner ends against the body of the bracket by helical springs 27.

For releasing the rollers, pins 28 are slidably fitted in the body of the bracket 16 and bear with their upper ends against the underneath faces of the inner ends of the angular levers 25. The lower ends of the pins 28 project below the bracket and upon the lever gravitating after each operation, are adapted to strike against the floor or base of the standard and raise the inner ends of the levers 25 thereby rocking out the outer ends so that the dogs 24 are released and the springs 22 permitted to return the rollers 17 to initial position.

In operation, the ring core is rotated after each fabric layer is laid, and the operator depresses the lever 13 to force the rollers 17 into intimate contact with the plies. The rollers move outwardly upon the carcass, as above stated, and generate concentric zones on the rotating carcass throughout all points of which zones the fabric layers will be pressed into intimate contact with each other. When the third roller 15 comes into contact with the carcass, the rollers 17 will have become locked at their outer limit of movement and are thus prevented from rubbing back against the fabric when the operator releases the lever after each operation. When the rolling mechanism gravitates into inoperative position upon the operator releasing the lever, the dogs 24 are released by contact of the pins 28 with the floor or base of the standard, and the rollers 17 are permitted to spring back to initial position ready for the next operation.

Having thus described my invention, what I claim as new and desire to protect by Letters Patent is:

1. A tire builder's tool comprising a pair of rollers adapted to contact with a tire, means for yieldingly holding the rollers adjacent each other, means for forcing the rollers against the tire, and pivots upon which the rollers move apart in curved paths in conforming to the surface of the tire.

2. A tire builder's tool comprising a pair of rollers pressed toward each other and adapted to engage the tread of the tire, means for forcing the rollers against the tire, pivots upon which the rollers move apart in curved paths in conforming to the transverse curvature of the tire, means for locking the rollers at their outer limit of movement, and means for releasing said locking means.

Signed at Hartford Ct., this 16 day of Aug. 1916.

CLARENCE A. ARNOLD.